United States Patent
Basile et al.

(10) Patent No.: US 8,717,348 B2
(45) Date of Patent: May 6, 2014

(54) SYSTEM AND METHOD FOR SYNCHRONIZING A VIEWING DEVICE

(75) Inventors: Gregory Raymond Basile, Van Alsytne, TX (US); Frank Joseph Poradish, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1684 days.

(21) Appl. No.: 11/644,071

(22) Filed: Dec. 22, 2006

(65) Prior Publication Data

US 2008/0151112 A1    Jun. 26, 2008

(51) Int. Cl.
*G06F 3/038* (2013.01)

(52) U.S. Cl.
USPC ............... 345/213; 345/1.2; 345/32; 345/2.1; 345/8; 345/665; 345/175; 348/51; 348/53; 348/54; 348/55; 348/56

(58) Field of Classification Search
USPC ............. 345/203, 643, 7–9, 213, 32, 1.2, 2.1, 345/665, 175; 348/500, 771, 52, 53, 55, 51, 348/56; 359/464, 466
See application file for complete search history.

(56) References Cited

U.S. PATENT DOCUMENTS

| | | | |
|---|---|---|---|
| 4,424,529 A | 1/1984 | Roese et al. | |
| 4,562,463 A * | 12/1985 | Lipton | 348/56 |
| 4,736,246 A * | 4/1988 | Nishikawa | 348/56 |
| 5,028,994 A | 7/1991 | Miyakawa et al. | |
| 5,821,989 A * | 10/1998 | Lazzaro et al. | 348/56 |
| 6,249,370 B1 | 6/2001 | Takeuchi et al. | |
| 6,456,432 B1 * | 9/2002 | Lazzaro et al. | 359/464 |
| 6,870,523 B1 * | 3/2005 | Ben-David et al. | 345/84 |
| 7,191,338 B2 * | 3/2007 | Stern et al. | 713/183 |
| 2002/0154145 A1 * | 10/2002 | Isakovic et al. | 345/643 |
| 2003/0133569 A1 * | 7/2003 | Stern et al. | 380/206 |
| 2004/0233527 A1 * | 11/2004 | Palovuori | 359/464 |
| 2009/0051759 A1 * | 2/2009 | Adkins et al. | 348/53 |

* cited by examiner

*Primary Examiner* — Olga Merkoulova
(74) *Attorney, Agent, or Firm* — Warren L. Franz; Wade J. Brady, III; Frederick J. Telecky, Jr.

(57) ABSTRACT

System and method for synchronizing shutter glasses with a display system. An embodiment comprises displaying a first image from a first image stream on a display plane, displaying a second image from a second image stream on the display plane, and displaying a synchronization signal on the display plane, during a first, a second, and a third display period, respectively. The first image and the second image are displayed at least partially on the same area of the display plane and the first and the second display periods do not overlap. The display of the synchronization signal on the display plane enables the elimination of a dedicated synchronization signal broadcast unit, thereby reducing the cost while increasing the reliability of a display system.

17 Claims, 4 Drawing Sheets

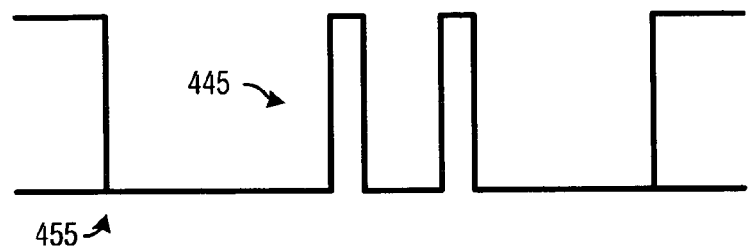
*Fig. 4b*
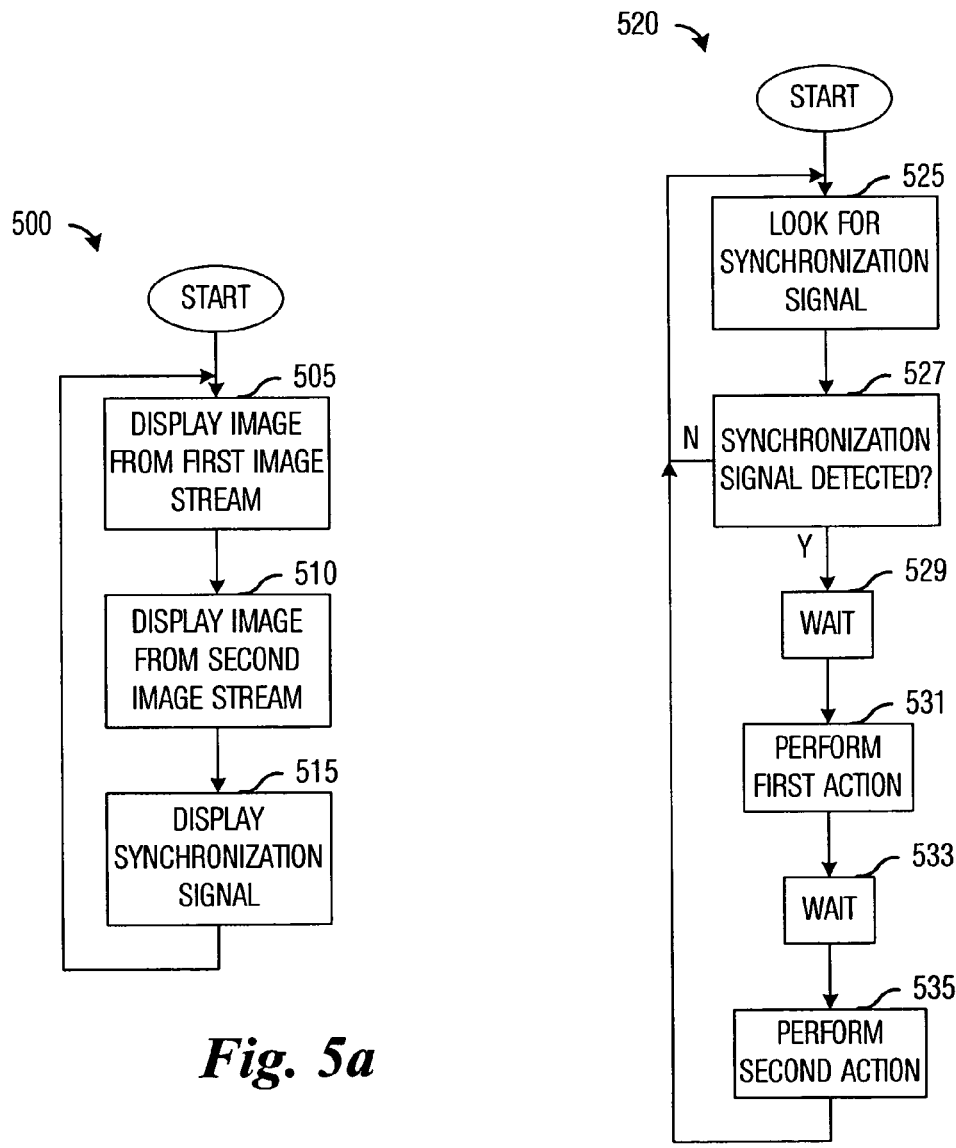
*Fig. 5a*
*Fig. 5b*

SYSTEM AND METHOD FOR SYNCHRONIZING A VIEWING DEVICE

TECHNICAL FIELD

The present invention relates generally to a system and method for displaying images, and more particularly to a system and method for synchronizing shutter glasses with a display system.

BACKGROUND

Standard televisions and projection display systems display two dimensional images. Images of three-dimensional objects and scenes are flattened to two-dimensions when the images are recorded and the resulting two-dimensional images are displayed without regaining any of the three-dimensional information. This is unfortunate since three-dimensional images may convey a large amount of information and three-dimensional images and video may enhance the viewers' enjoyment.

It may be possible to recreate three-dimensional images from two two-dimensional images with each two-dimensional image being a recording of a three-dimensional scene taken with slightly different perspectives. When the two two-dimensional images are displayed, each two-dimensional image being viewed solely by one of a viewer's two eyes, the three-dimensional scene is recreated by the viewer's optic system. In order to properly recreate the three-dimensional scene, each of the viewer's two eyes should see only one of the two two-dimensional images.

An inexpensive and widely used technique of recreating three-dimensional images involves displaying a red monochrome image (or video) and a blue monochrome image (or video), with the red monochrome image and the blue monochrome image providing different perspectives of the same scene, and using an eyeglass with a red filter and a blue filter. The eye behind the red filter will only see the blue monochrome image and the eye behind the blue filter will only see the red monochrome image.

Another inexpensive and widely used technique for recreating three-dimensional images involves displaying a first image using polarized light of a first polarity and a second image using polarized light of a second polarity, wherein the first polarity and the second polarity being orthogonal. A viewer would use eyeglasses with polarized lenses, with a first lens with the first polarity and a second lens with the second polarity. The first lens would then block the second image, permitting a first eye to visualize only the first image, and the second lens would block the first image, permitting a second eye to visualize only the second image.

SUMMARY OF THE INVENTION

These and other problems are generally solved or circumvented, and technical advantages are generally achieved, by embodiments of the present invention which provide a system and a method for synchronizing shutter glasses and display systems.

In accordance with an embodiment, a method for displaying multiple images on a projection display system is provided. The method includes displaying a first image from a first image stream on a display plane during a first display period, displaying a second image from a second image stream on the display plane during a second display period, and displaying a synchronization signal on the display plane during a third display period. The first image and the second image are displayed at least partially on a same area of the display plane and the first and the second display periods do not overlap.

In accordance with another embodiment, a method for synchronizing a viewing device to a display system is provided. The method includes detecting a synchronization signal displayed on a display plane of the display system, receiving the synchronization signal, and performing an action in response to the synchronization signal.

In accordance with another embodiment, a display system is provided. The display system includes a light source, an array of light modulators optically coupled to the light source, and a controller electronically coupled to the array of light modulators and to the light source. The array of light modulators produces images and display synchronization signals on a display plane by modulating light from the light source based on image data, and the controller generates a stream of light commands and array commands, inserts the synchronization signals into the stream of light commands and array commands, and converts the stream of light commands and array commands into a pulse-width modulated signal stream.

An advantage of an embodiment is the elimination of a dedicated synchronization emitter, which typically is an external device coupled to a projection display system. The elimination of the dedicated synchronization emitter may reduce the component count of the projection display system, which may help keep the costs of the projection display system to a minimum. Furthermore, a reduction in the number of components may increase product reliability since there are fewer components that may fail.

A further advantage of an embodiment is that existing projection display system hardware is sufficient. Therefore the capability of displaying three-dimensional images and/or dual images using standard projection display system hardware will require only a small development and cost investment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIGS. 4a and 4b are diagrams of exemplary PWM sequences and shutter states over time; and FIGS. 5a through 5d are diagrams of sequences of events in the display of a synchronization signal by a projection display system and a synchronization of a device to the projection display system.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a DMD-based projection display system. The invention may also be applied, however, to other microdisplay-based projection display systems, such as projection display systems utilizing deformable micromirrors, transmissive and reflective liquid crystal, liquid crystal on silicon, and so forth, microdisplays.

Figure 1:
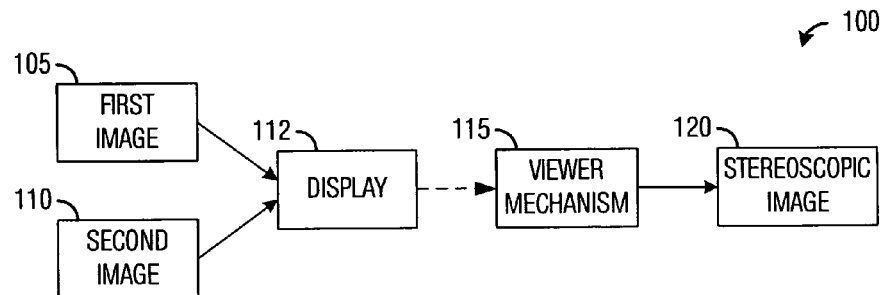
FIG. 1 is a diagram of a stereoscopic image display system.

With reference now to FIG. 1, there is shown a diagram of a stereoscopic image display system 100. The stereoscopic image display system 100 includes a display 112 that may be used to display a first image 105 and a second image 110. The first image 105 and the second image 110 may be images of the same scene, taken with different perspectives. The first image 105 and the second image 110 may be images from image streams, such as video image streams. The display 112 may display the first image 105 and the second image 110 simultaneously or sequentially, depending on the type of technology used in the stereoscopic image display system 100. For example, if the stereoscopic display system 100 uses optical or chromatic differences to separate the first image 105 from the second image 110, then both images may be displayed simultaneously. On the other hand, the stereoscopic display system 100 may have to sequentially display the images if the stereoscopic display system 100 utilizes temporal separation to separate the images.

A viewer mechanism 115, normally worn by a user in the form of eyeglasses or goggles, may separate the images. The viewer mechanism 115 utilizing optical (for example, different polarities of light) or chromatic (for example, monochrome images with different base colors) filters may separate the images that are optically or chromatically different but displayed simultaneously, while mechanical shutters in another embodiment of the viewer mechanism 115 may block the view of one image while permitting the other image to be viewed if the images are separated temporally. The user's optic system may then combine the different views of the same scene into a stereoscopic image 120.

Figure 2A:
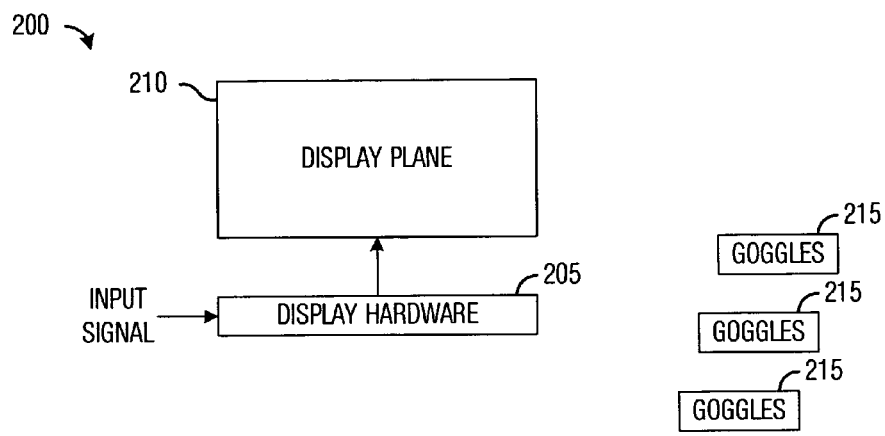
FIGS. 2a and 2b are diagrams of prior art image display systems.
Figure 2B:
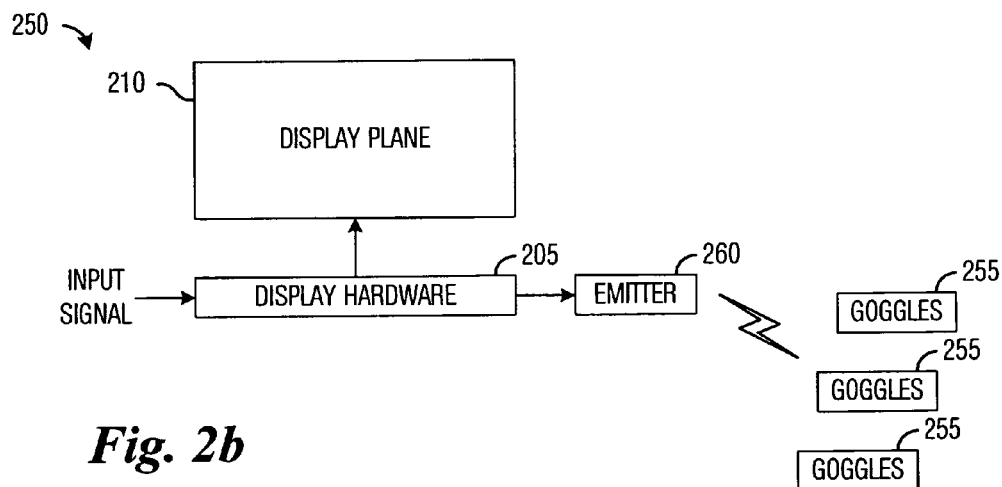

With reference now to FIGS. 2a and 2b, there are shown diagrams illustrating prior art image display systems. The diagram shown in FIG. 2a illustrates an image display system 200 that utilizes optical or chromatic differences between two images to create a stereoscopic image. The image display system 200 includes display hardware 205 that may be used to display the images onto a display plane 210. The display hardware 205 may have as input an input signal containing a first image and a second image. The display hardware 205 may then process the first image and the second image as needed to display the images. For example, if the image display system 200 is a film projector, then the first image and the second image may be in the form of photographic film and the display hardware 205 may include a light source and lenses necessary to project the images onto the display plane 210. Alternatively, if the image display system 200 is a microdisplay-based projection display system, then the first image and the second image may be in digital form that may require filtering, color correction, and so forth, prior to being used by the microdisplay, which subsequently modulates a light produced by a light source. The modulated light may then project onto the display plane 210.

Goggles 215 (or eyeglasses), an embodiment of a viewer mechanism, may separate the first image from the second image using color filters if the images are differentiated by their chromatic differences or using optical filters if the images are differentiated by the polarities of the light projecting the images, for example. Each eye of the viewer sees only one of the two images and the optic system of the viewer combines the two images into a single stereoscopic image.

The diagram shown in FIG. 2b illustrates an image display system 250 that utilizes temporal separation. Similar to the image display system 200 of FIG. 2a, the image display system 250 includes display hardware 205 and a display plane 210. However, because the image display system 250 uses temporal separation to separate a first image from a second image, properly synchronizing the images displayed on the display plane 210 with goggles 255 (or eyeglasses), an embodiment of a viewer mechanism, may be important in creating the desired stereoscopic images.

An emitter 260 coupled to the display hardware 205 may emit infrared, ultrasonic, radio frequency, or some other form of signal to the goggles 255. The signals emitted by the emitter 260 may convey timing information to the goggles 255, which the goggles 255 may use to ensure that synchronization with the displayed images is maintained. The emitter 260 may obtain timing information from the display hardware 205, such as when the display hardware 205 initiates the display of an image. The emitter 260 may then provide the timing information to the goggles 255 so that the goggles 255 may prevent one of the two eye pieces from viewing the display plane 210, for example, by closing an electronic shutter, thereby preventing the viewer from seeing the image being displayed.

A display system as shown in FIG. 2b may be used as a multi-view display system in addition to displaying stereoscopic images. A multi-view display system may permit a first viewer of the display system to view a first video stream and a second viewer of the display system to view a second video stream, with the first video and the second video potentially being completely independent. The multi-view display system may display multiple videos using a single display. Instead of displaying two images with each image providing a different perspective of the same scene, each of the two images provides a view of a different video. In a multi-view display system, viewers may view different videos while watching the same display system.

Examples of such an image display system are described in U.S. Pat. No. 5,028,994, entitled "Synchronized Three Dimensional Imaging Apparatus," issued Jul. 2, 1991, U.S. Pat. No. 4,562,463, entitled "Stereoscopic Television System with Field Storage for Sequential Display of Right and Left Images," issued Dec. 31, 1985, and U.S. Pat. No. 4,424,529, entitled "Remotely Triggered Portable Stereoscopic Viewer System," issued Jan. 3, 1984, which patents are incorporated herein by reference.

Figure 3A:
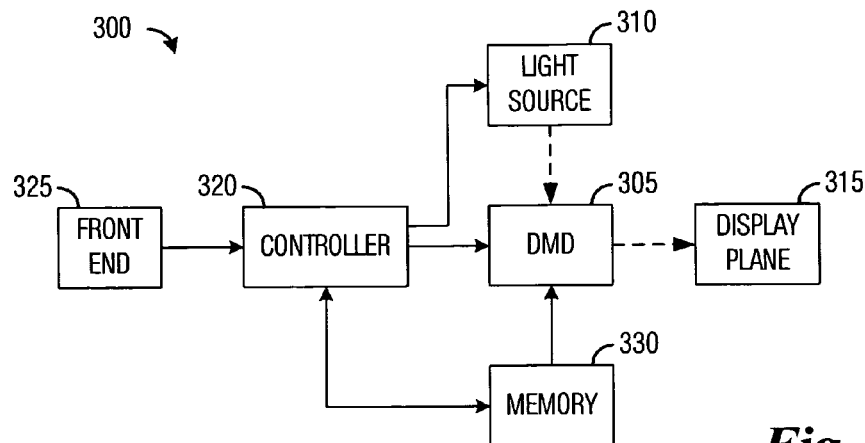
FIGS. 3a and 3b are diagrams of an exemplary projection display system.
Figure 3B:
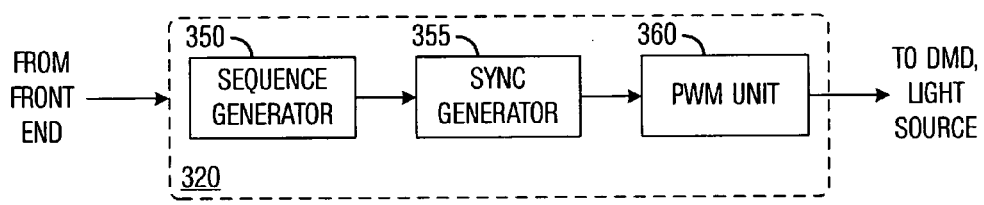

With reference now to FIGS. 3a and 3b, there are shown diagrams illustrating an exemplary projection display system 300. The display system 300 utilizes a spatial light modulator, more specifically an array of light modulators 305, wherein individual light modulators in the array of light modulators 305 assume a state corresponding to image data for an image being displayed by the display system 300. The array of light modulators 305 is preferably a digital micromirror device (DMD) with each light modulator being a positional micromirror. For example, in display systems where the light modulators in the array of light modulators 305 are micromirror light modulators, then light from a light source 310 may be reflected away from or towards a display plane 315. A combination of the reflected light from the light modulators in the array of light modulators 305 produces an image corresponding to the image data.

A controller 320 coordinates the loading of the image data into the array of light modulators 305, controlling the light source 310, and so forth. The controller 320 may be coupled to a front end unit 325, which may be responsible for operations such as converting analog input signals into digital, Y/C separation, automatic chroma control, automatic color killer, and so forth, on an input video signal. The front end unit 325 may then provide the processed video signal, which may contain image data from multiple streams of images to be displayed to the controller 320. For example, when used as a stereoscopic display system, the front end unit 325 may provide to the controller 320 image data from two streams of images, each stream containing images with different perspectives of the same scene. Alternatively, when used as multi-view display system, the front end unit 325 may provide to the controller 320 image data from multiple streams of images with each stream containing images of unrelated content. The controller 320 may be an application specific integrated circuit (ASIC), a general purpose processor, and so forth, and may be used to control the general operation of the projection display system 300. A memory 330 may be used to store image data, sequence color data, and various other information used in the displaying of images.

The diagram shown in FIG. 3b displays a detailed view of the controller 320. The controller may include a sequence generator 350, a synch signal generator 355, and a pulse-width modulation (PWM) unit 360. The sequence generator 350 may be used to generate color sequences that specify the colors and durations to be produced by the light source 310 as well as control the image data that is loaded into the array of light modulators 305. In addition to generating the color sequences, the sequence generator 350 may have the capability of reordering and reorganizing the color sequence (and portions thereof) to help reduce noise (PWM noise) that may negatively impact image quality.

The synch signal generator 355 may produce signals that enable the viewer mechanism 115 (FIG. 1) to synchronize with the images being displayed. The synch signals may be inserted into the color sequences produced by the sequence generator 350 and then may be displayed by the projection display system 300. According to an embodiment, because the synch signals produced by the synch signal generator 355 are displayed by the projection display system 300, the synch signals generally are inserted into the color sequences during a time when the viewer mechanism 115 are in a block view state, for example, when both shutters of a pair of viewing goggles are in a closed state. This may allow for the synch signal to be detected by the viewer mechanism 115 but prevent the user from actually seeing the synch signal. The color sequence containing the synch signals may be provided to the PWM unit 360, which may convert the color sequence into a PWM sequence to be provided to the array of light modulators 305 and the light source 310.

The images projected by the projection display system 300 may be viewed by users wearing viewer mechanisms. Examples of viewer mechanisms may be goggles, glasses, helmets with eye pieces, and so forth. The viewer mechanisms may contain a sensor(s) that may allow the viewer mechanism to detect the synch signals displayed by the projection display system 300. The viewer mechanisms may utilize a variety of shutters to enable and disable the user from seeing the images displayed by the projection display system. The shutters may be electronic, mechanical, liquid crystal, and so forth. An electronic shutter may block light or pass light or based on a polarity of an electric potential applied change a polarity of an electronic polarizer. A liquid crystal shutter may operate in a similar manner, with the electric potential changing the orientation of liquid crystals. A mechanical shutter may block or pass light when a motor, for example, moves mechanical light blocks in and out of position.

There may be an advantage if the projection display system 300 operates at a fixed rate based on a crystal reference, for example. The frame rate of the signal input to the projection display system may be converted to match the frame rate of the projection display system 300. The conversion process typically drops and/or adds lines to make up any timing difference. Eventually, an entire frame may need to be repeated and/or dropped. An advantage from the viewer mechanism's point of view may be that it is easier to track a dark time of a PWM sequence and synchronize the synch signals. Furthermore, it may enable the viewer mechanism to filter out disturbances and remain locked to the PWM sequence for an extended amount of time. This may occur when the viewer mechanism fails to detect the synch signal. For example, this may occur under normal operating conditions if a detector on the viewer mechanism is blocked or oriented away from the display plane.

Figure 4A:
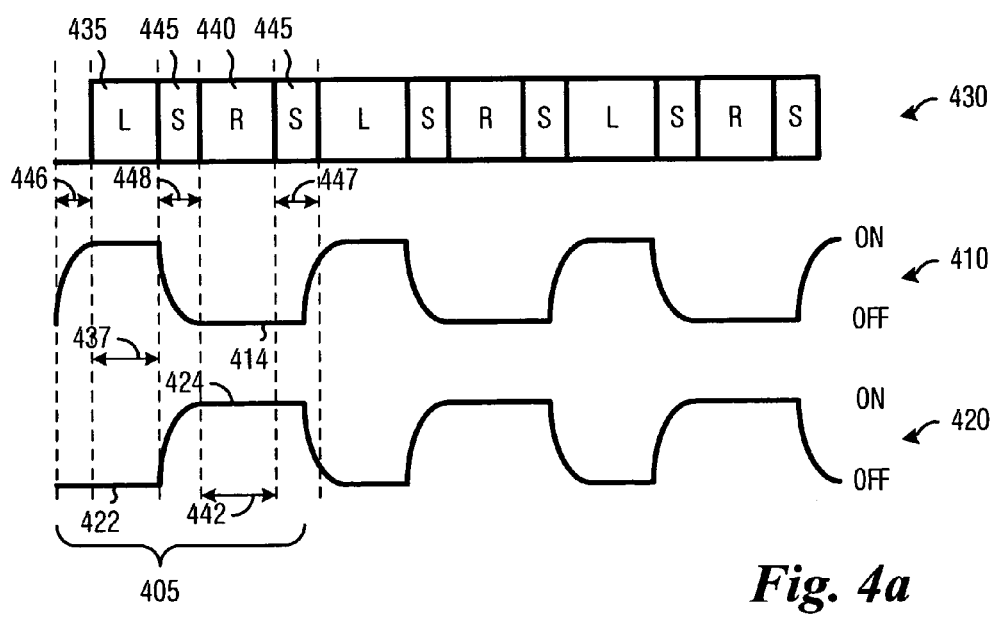

With reference now to FIGS. 4a and 4b, there are shown diagrams illustrating exemplary PWM sequences and shutter states over a period of time. The diagram shown in FIG. 4a illustrates shutter states for a left eye (shown as trace 410) and a right eye (shown as trace 420) of a viewer mechanism 115 and a high level view of a PWM sequence (shown as trace 430) as produced by a PWM unit, for example. In order to properly operate as a stereoscopic display system, only one of the two shutters of the viewer mechanism 115 should be in an on state at any given time. However, both shutters may simultaneously be in an off or on state.

The discussion focuses on a single cycle 405 of the shutter states. The first trace 410 displays shutter state for the left eye (left eye shutter). At the beginning of the cycle 405, the left eye shutter is in transition from an off state to an on state (an interval 446 illustrates a time span wherein the state transition occurs). After a period of time, the left eye shutter transitions back to an off state (the state transition occurs during an interval 448). As the left eye shutter transitions from the on state to the off state, the shutter state for the right eye (right eye shutter) may begins begin its transition from the off state to the on state (the interval 448 also illustrates the time span wherein the state transition occurs for the right eye).

While the left eye shutter is on (for example, during an interval 437), image data related to an image to be viewed by the left eye may be displayed. Therefore, the PWM sequence contains control instructions to display the image intended for the left eye. The third trace 430 displays a box 435 representing PWM control instructions for displaying a left eye image, encompassing an interval 437. The interval 437 generally starts after the left eye shutter completes its transition to the on state. This may be due to a finite transition time between the on and off states of the viewer mechanism 115. A similar delay occurs after the left eye shutter begins its transition to the off state. Then, when the left eye shutter turns off and the right eye shutter turns on (for example, during pulses 414 and 424), image data related to an image to be viewed by the right eye may be displayed. The third trace 430 displays a box 440 representing PWM control instructions for displaying a right eye image, encompassing an interval 442.

In the trace 430, the times between the PWM sequences for the left eye (box 435) and the PWM sequences for the right eye (box 440), may normally be left blank without any PWM control instructions. For example boxes 445 occurring during shutter transition times (shown as intervals 447 and 448). This may be done to prevent the right eye from seeing faint left eye data as the left eye shutter transitions from the on state to the off state (during the interval 448) and the left eye from seeing faint right eye data as the right eye shutter transitions from the on state to the off state (during the interval 447). These times may then be used to display the synch signals. Rather than being blank without any PWM control instructions, the times represented by boxes 445 may contain PWM control instructions necessary to display the synch signals, along with any data and operating mode information that the synch signals may need to provide.

The diagram shown in FIG. 4b illustrates an exemplary synch signal contained in the box 445. The synch signal shown in FIG. 4b may be a simple timing synch signal that may be used to signify when to start a next cycle of the shutter states. For example, when the viewer mechanism 115 detects the synch signal, it may begin a left eye shutter transition from the off state to the on state, hold for a specified (potentially preprogrammed) amount of time, begin a left eye shutter transition from the on state to the off state, begin a right eye shutter transition from the off state to the on state, hold for a specified (potentially preprogrammed) amount of time, and begin a right eye shutter transition from the on state to the off state. The left eye shutter and the right eye shutter transitions may occur simultaneously or be staggered as required.

The synch signal shown in FIG. 4b, which may occur during box 445, may start approximately 270 microseconds after the PWM control sequence ends (at about time 455). The synch signal may then transition to a high state for about 6 microseconds and then transition back to a low state for about 24 microseconds. The synch signal may then transition back to the high state for about 6 microseconds and then transition back to the low state until the end of the box 445.

Potentially more complex synch signals may be displayed. For example, the synch signal may specify the shutter on time duration, the time when the transitions should start, which eye shutter should transition first, the operating mode of the display system (such as three-dimensional images or multi-view, for example), control data, information, and so forth. Furthermore, the synch signal may be encoded so that only viewer mechanisms 115 that are authorized will be able to process the information contained in the synch signal. The overall complexity of the synch signals may be dependent on factors that include: required function of synch signal, desire to maintain control over peripherals used with the display system, available synch signal signaling duration, and so forth.

The synch signal may be displayed as any color producible by a display system. In display systems that utilize a fixed color sequence, such as a display system using a color wheel, a single color may be used to display the synch signals. For example, in a seven-color multiprimary display system that uses the colors red, green, blue, cyan, magenta, yellow, and white, any of the colors may be used to display the synch signals. However, a preferred color may be the color yellow since it is one of the brighter colors and its use may have less of a negative effect on the displaying of the other colors. Alternatively, a dimmer color, such as blue, may be used to display the synch signal. The use of the color blue may be preferred since the use of the dimmer color may make the synch signals less detectable by viewers. Although it is preferred that a single color be used to display the synch signals, multiple colors may be used. For example, it may be possible to encode information in the colors used to display the synch signal. In a display system that does not utilize a fixed color sequence, any color may be used. Additionally, the discussion of the seven-color multiprimary display system, other display systems with a different number of display colors may be used, and should not be construed as being limiting to either the scope or the spirit of the present invention.

In order to permit the display of the synch signal and to keep the viewer from detecting the display of the synch signal, the synch signal may be displayed when both the left eye shutter and the right eye shutter are in the off state. In FIG. 4a, the trace 430 displays a box 445 representing PWM control instructions for displaying a synch signal, contained in an interval 447. The duration of the interval 447 may be dependent on factors such as the complexity of the synch signal, the presence of any encoding of the synch signal, the data carried in the synch signal, and so forth. Additionally, the duration of the interval 447 may be dependent on factors such as the shutter transition time. For example, if the shutter transition time is long, then the interval 447 should also be long to ensure that both shutters are closed prior to the display of the synch signal. Alternatively, the synch signal does not need to be generated for the entire interval represented by box 445. Although it is desired that the viewer not be able to detect the synch signal, the display of the synch signal may be detectable as a moderate increase in the brightness of the display system's black level.

Figure 5C:
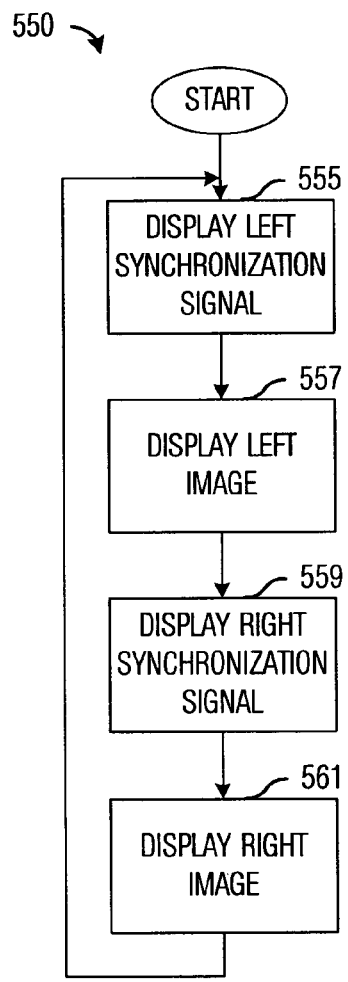

With reference now to FIGS. 5a through 5d, there are shown diagrams illustrating sequences of events in the display of a synchronization signal by a projection display system and a synchronization of a device to the projection display system. The diagram shown in FIG. 5a illustrates a sequence of events 500 in the display of images from multiple image streams and a synch signal in a projection display system, with the synch signal used to provide timing information to a viewing device. The displaying of images from multiple image streams may begin with the display of a first image from a first image stream (block 505). Preferably, the first image in its entirety (progressive or interlaced), is displayed. However, restrictions, such as display duration restrictions, image quality restrictions, and so forth, may require that a portion of the first image be displayed. For example, a single field of the first image may be displayed. After the first image from the first image stream has been displayed, then a second image from a second image stream may be displayed (block 510). Again, the entire second image may be displayed or only a portion of the image may be displayed. However, the amount of the first image displayed and the amount of the second image displayed preferably are substantially the same. Alternatively, the times may be different.

With the first image and the second image displayed, then the projection display system may display a synch signal (block 515). The displaying of the synch signal may occur at any time, however, and a preferred time for displaying the synch signal may be when viewers of the projection display system may not be able to visually detect the synch signal. For example, the viewers may be using electronically shuttered goggles, then the synch signal may be displayed when the shutter over each eye is closed. The projection display system may determine when the shutters are closed because, for example, the projection display system generally specifies when the shutters are to be closed, either during an initial configuration operation, in a previously displayed synch signal, or in a manufacturer specified duration that is known to both the projection display system and the goggles. The projection display system, however, does not necessarily need to determine when the shutters are closed for proper operation. Generally, as long as the synch signals are displayed at the beginning or the end of the period without PWM control sequences intended for either eye, such as box 445, manufacturers of the goggles may time the shutter transitions to mask out the synch signals. Once the projection display system has displayed the synch signal in block 515, the projection display system may return to displaying images (or parts of images) from the first and the second image streams.

The diagram shown in FIG. 5b illustrates a sequence of events 520 for a viewer device in a mode of operation for the detection of a synch signal and responding to the detected synch signal. The detection of the synch signal may occur in blocks 525 and 527, when the viewer device looks for the synch signal (block 525) and checks to see if a signal that it detected is the synch signal (block 527). If the signal is not the synch signal, then the viewer device may return to looking for the synch signal (block 525). If the signal is the synch signal, then the viewer device waits for a specified amount of time (block 529) and then performs a specified first action (block 531), such as change state transition. The viewer device may then wait for another specified amount of time (block 533) and then performs another specified second action (block 535). With the specified second action complete, the viewer device may return to looking for the synch signal (block 525).

The diagram shown in FIG. 5c illustrates a sequence of events 550 in the displaying of a synch signal and corresponding images. The sequence of events 550 may begin with a display system displaying a synch signal associated with a left eye image (block 555), followed by displaying the left eye image (block 557). After displaying the left eye image, the display system may display a synch signal associated with a right eye image (block 559), followed by displaying the right eye image (block 561). The sequence of events 550 may be used in a display system wherein the detection of the synch signals may not be ensured. In such a display system, previous synch signals may not be used to determine when to transition and a transition occurs only when an associated synch signal is detected.

Figure 5D:
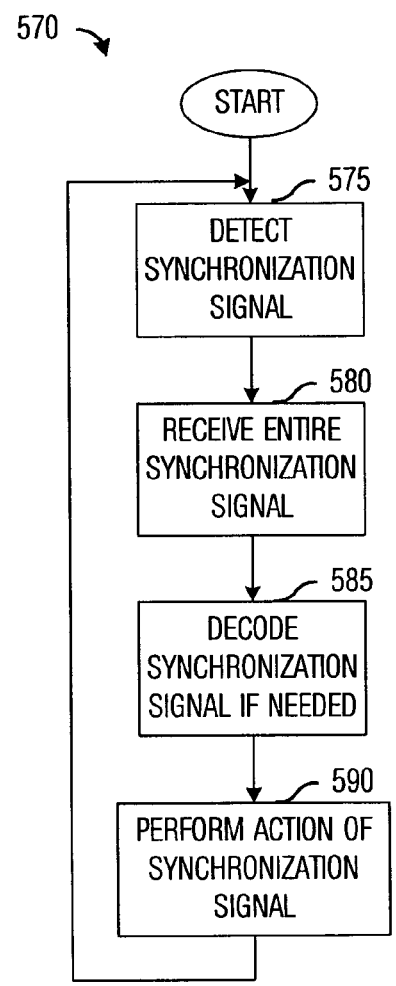

The diagram shown in FIG. 5d illustrates a sequence of events 570 in the detection of a synch signal and responding to the detected synch signal. The sequence of events 570 begins with the detection of the synch signal (block 575). The detection of the synch signal may be aided if the synch signal contains a rarely occurring start sequence and/or stop sequence. Additionally, if the synch signal is displayed only when the viewer mechanism 115 is in a specified state (such as the shutters of the goggle being closed), then the control hardware in the viewer mechanism 115 may be configured to attempt synch signal detection when it is in the specified state. Once the viewer mechanism 115 detects the synch signal, the synch signal may be received in its entirety (block 580). If necessary, the synch signal may be decoded (block 585). With the synch signal received and decoded (if needed), the viewer mechanism 115 may perform the action specified either by the synch signal or in the synch signal (block 590).

Although the embodiments and their advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for displaying multiple images on a projection display system, the method comprising:
    displaying a first image from a first image stream on a display surface during a first display period by modulating light using a spatial light modulator;
    displaying a second image from a second image stream on the display surface during a second display period by modulating light using the spatial light modulator, wherein the first image and the second image are displayed at least partially on a same area of the display surface;
    displaying a synchronization signal on the display surface during a third display period by modulating light using the spatial light modulator, wherein the first display period, the second display period, and the third display period do not overlap; and
    detecting the displayed synchronization signal for control of viewing the displayed first and second images with a viewing device.

2. The method of claim 1, wherein the first image and the second image comprise different perspectives of a single scene.

3. The method of claim 1, wherein the first image stream and the second image stream comprise unrelated image streams.

4. The method of claim 1, wherein the displaying of the first and the second images each comprises:
    illuminating an array of light modulators in the projection display system with a sequence of colored light; and
    setting each individual light modulator in the array of light modulators to a state that corresponds to a colored light illuminating the array of light modulators and to image data from an image being displayed.

5. The method of claim 1, wherein detecting the displayed synchronization signal comprises detecting the displayed synchronization signal by a pair of viewing goggles for control of operation of left and right eye shutters of the viewing goggles.

6. The method of claim 1 further comprising after displaying the synchronization signal, repeating the displaying of a first image from a first image stream, the displaying of a second image from a second image stream, and the displaying of a synchronization signal.

7. The method of claim 1, wherein the synchronizing signal is encrypted, and wherein detecting the displayed synchronization signal comprises decrypting the synchronizing signal.

8. The method of claim 1, wherein detecting the displayed synchronization for control of viewing the displayed first and second images with a viewing device comprises actuating a shutter.

9. The method of claim 4, wherein the displaying of the synchronization signal comprises:
    illuminating the array of light modulators with a single color of light; and
    setting individual light modulators in the array of light modulators to an on state, wherein the on state permits the light illuminating the array and modulated by the spatial light modulator to reach the display surface.

10. The method of claim 4, wherein the state of each individual light modulator is based on a color of light that is currently illuminating the array of light modulators and image data associated with the color of light.

11. The method of claim 5, wherein the single color of light comprises a combination of light of different wavelengths.

12. The method of claim 5, wherein every light modulator in the array of light modulators is set to the on state.

13. A display system comprising:
a light source;
an array of light modulators optically coupled to the light source, the array of light modulators configured to produce and display images based on image data and synchronization signals on a display surface by modulating light from the light source;
a controller electronically coupled to the array of light modulators and to the light source, the controller configured to generate a stream of light commands and array commands, to insert the synchronization signals into the stream of light commands and array commands, and to convert the stream of light commands and array commands into a pulse-width modulated signal stream, wherein the display of the synchronization signals and the images occur during separate display periods; and
a viewing device configured for detecting the displayed synchronization signals and controlling the viewing of the displayed images in response to the detection of the displayed synchronization signals.

14. The display system of claim 13, wherein the controller comprises: a command generator electrically coupled to a front end unit, the command generator configured to generate the stream of light commands and array commands for images received from a signal input; a synch signal unit electrically coupled to the command generator, the synch signal unit configured to insert synchronization signals into the stream; and a modulator unit electrically coupled to the synch signal unit, the modulator configured to convert stream into a pulse-width modulated signal stream.

15. The display system of claim 13, wherein the array of light modulators is a spatial light modulator.

16. The display system of claim 13, wherein the viewing device is a pair of viewing goggles configured for controlling operation of left and right eye shutters in response to the detection of the displayed synchronization signals.

17. The display system of claim 15, wherein the spatial light modulator is a digital micromirror device.

* * * * *